United States Patent Office 3,020,701
Patented Feb. 13, 1962

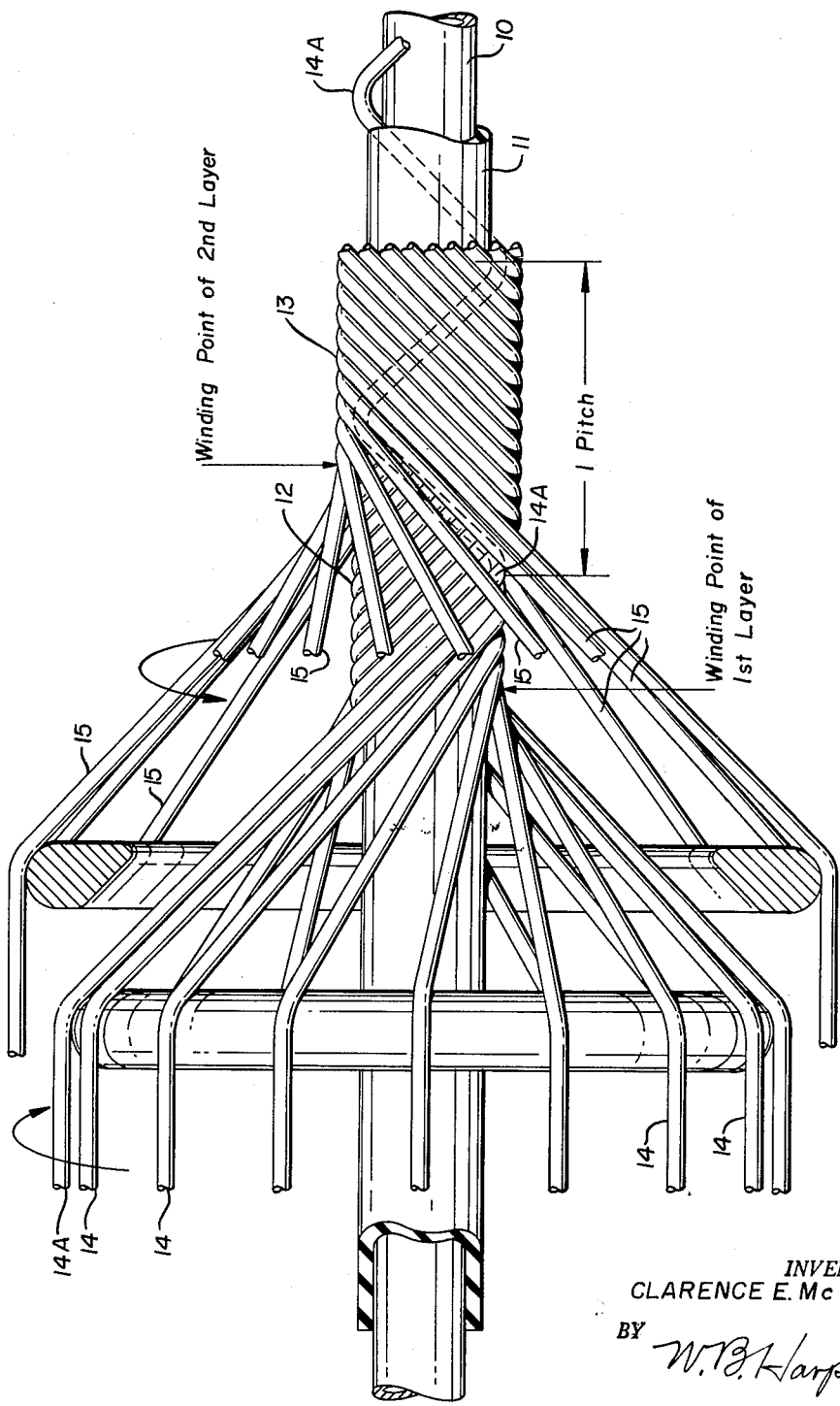

3,020,701
METHOD OF WINDING WIRE REINFORCING MEMBERS ON A RESILIENT TUBE
Clarence E. McCormick, Poland, Ohio, assignor to Lee Rubber & Tire Corporation, doing business as Republic Rubber Division, Youngstown, Ohio, a corporation of Ohio
Filed June 16, 1960, Ser. No. 36,523
7 Claims. (Cl. 57—160)

This invention relates to a method of winding a plurality of wires in a plurality of layers on a distortable tube such as, for example, is employed in the formation of high pressure hose.

In forming high pressure hose, it is customary to form the hose on a mandrel, usually steel, and to position a tube of rubber-like material on the mandrel and subsequently form separate and distinct spirally wrapped layers of wires thereabout.

The principal object of the invention is the improved method of winding a plurality of wires in a plurality of layers on a rubber tube so that all of the wires in each of the several layers are uniformly tensioned and positioned.

A further object of the invention is a method of laying multiple wires in a helical pattern in at least two layers on a resilient base such as a rubber tube in building a high pressure hose wherein the wires of the first group are tensioned and positioned simultaneously with the tensioning and positioning of the wires of the second group so that each of the wires of each group are uniformly tensioned and uniformly positioned with respect to one another.

A further object of the invention is a method of forming a uniform wire helix oppositely disposed over a similar uniform wire helix with the displacing wires in the first helix.

A still further object of the invention is the provision of a method of forming oppositely disposed spirally wound layers of wire in a high pressure hose wherein any slack or looseness developed in any wire is immediately taken up in the winding process.

A method of winding multiple wires in superimposed helical patterns or layers over a resilient base such as a rubber tube has heretofore been proposed and is used in the formation of high pressure hose. Hose so formed has frequently developed ruptures, and I have determined that such ruptures are due to the displacement of individual wires in the construction particularly those in the initially formed helical pattern or layers. I have determined that the displacement occurs at the time the second pattern or layer of multiple wires is formed over the first layer due to the pressure of the second layer depressing the wires of the first layer into the resilient tube so as to force the rubber of the tube up between the wires and thereby reduce the diameter of the tube and the first layer of wires. Such a reduction of diameter creates an excess of wire resulting in a slight extra length at each revolution in the winding of the spiral patterns whereby a slight amount of wire length is gained at each revolution. This excess length loosens the layer and causes a wave of rows of wires a few inches long to move in front of the winding point of the second layer of wires. This wave, distorting the wires and displacing the proper lay of the wires in their helical pattern, causes some of the wires to be displaced with respect to one another and creates a weak point which will result in an inferior hose likely to rupture at such weak point.

A method of winding wire reinforcing members on a resilient tube which avoids these several problems is disclosed herein.

With the foregoing and other objects in view which will appear as the description proceeds, the invention resides in the method hereinafter described and claimed, it being the intention to cover all changes and modifications of the example of the invention herein chosen for purposes of the disclosure, which do not constitute departures from the spirit and scope of the invention.

The invention is illustrated in the accompanying drawing.

By referring to the drawing it will be seen that a metal mandrel 10 having a tube 11 of rubber positioned thereon is provided with a first and second layer of oppositely disposed spirally wrapped reinforcing wires each of which follows a helical pattern. The first layer of wires is generally indicated by the numeral 12 and the second layer of wires is generally indicated by the numeral 13.

It will be seen that the first layer of reinforcing wires 12 comprises a plurality of wires 14, 14 which are simultaneously spirally wound over the rubber tube 11 under even tension and at a rate of advance so that an evenly tensioned closely spaced wrapping results. One of the wires 14 is indicated by the numeral 14A and its helical path about the rubber tube 11 is illustrated in solid and broken lines so that the distance between comparable points of adjacent convolutions of said wire may be seen. The distance between comparable points of adjacent convolutions in a single wire such as 14A comprises one pitch of the wire helix and it will be understood that the same spacing applies to each of the adjacent convolutions of each of the plurality of wires forming each of the layers 12 and 13 of the reinforcing wires.

Still referring to the drawing, it will be seen that the point at which the wires 14 of the first layer of reinforcing wires wound on the rubber tube 11 contact the same has been identified with an arrow and the legend "winding point of first layer" and that the point of first contact between the plurality of wires 15, 15 of the second group of reinforcing wires and the wires of the first layer has been indicated with an arrow and the legend "winding point of second layer." It will be observed that the winding point of the wires 15, 15 of the second layer 13 is spaced with respect to the winding point of the first layer 12 a distance less than one pitch of one of the wires 14A of the first layer 12 of the reinforcing wires 14, 14.

I have determined that by winding the first layer 12 of the reinforcing wires 14, 14 and the second layer 13 of the reinforcing wires 15, 15 practically simultaneously and with less than the distance of one pitch of one of the wires 14 of the first layer 12 between the winding points of the first and second layers of reinforcing wires 14, 14 and 15, 15 respectively avoids any tendency of the wires 14, 14 of the first layer 12 to become loose or displaced as any such tendency is immediately corrected by the tensioning of the wires 14, 14 by the tension and wrapping apparatus. Thus, for example, as looseness develops in the wire 14A in the convolution approximately two pitches distant from its point of winding such looseness will not remain and the wire 14A will not become displaced to leave a weak point in the reinforcing layer 12 but on the contrary, the tensioning and winding apparatus employed will move the wire 14A longitudinally and sprially of the layer 12 sufficiently to take up the looseness and insure the retention of the wire 14A in its desired proper position in the layer 12.

Those skilled in the art will therefore observe that to effectively practice the method herein disclosed the multiple layers 12 and 13 of reinforcing wires wound over a resilient or deformable tube or core must be wound in close proximity to one another and so that the winding points of the wires as hereinbefore described are spaced approximately one pitch of one of the wires of the initial layer whereupon the several objects of the invention may be realized.

It will thus be seen that a method of winding wire reinforcing members on a resilient tube has been disclosed herein which meets the several objects of the invention and having thus disclosed my invention, what I claim is:

1. The method of winding a plurality of wires in a plurality of layers on a resilient tube which comprises winding a first group of said wires about said tube simultaneously in a helical pattern with each of said wires of said first group in side by side relation and simultaneously winding a second group of said wires simultaneously on said first winding and at a distance from the point of winding of said first group within one pitch of one of said wires of said first group of wires.

2. The method of winding a plurality of wires in a plurality of layers on a resilient tube as set forth in claim 1 and wherein said layers of wires are wound in oppositely disposed spiral patterns.

3. The method of winding a plurality of wires in a plurality of layers on a resilient tube in the formation of wire reinforced high pressure hose which comprises tensioning and spirally winding a first group of wires about said resilient tube with each of said wires of said first group uniformly positioned in relation to the other wires of said first group to form an even tubular layer of said wires over said resilient tube and simultaneously tensioning and winding a second group of wires in an oppositely disposed spiral pattern over said first layer of wires at a point thereon between about one-half to one pitch of one of the wires of the first group relative to the point of winding of said first group of wires.

4. The method of forming a high pressure hose which includes positioning a rubber tube on a mandrel, positioning a first group of reinforcing wires in circumferentially spaced relation to one another and in radially spaced position to said rubber tube rotating said mandrel and rubber tube while moving it axially of said plurality of wires whereby said plurality of wires are wound spirally about said rubber tube in a uniform layer with each wire of said group positioned in a helical pattern alongside another wire of said group and tensioning said wires during said winding thereof and simultaneously winding a second group of circumferentially spaced wires spaced radially with respect to said resilient tube and said first layer of wires wound thereon on said first layer of wires at a point on said layer of wires at a distance from the point of winding of said first layer of wires of approximately one pitch of one of the wires of said first layer of wires.

5. The method of forming a wire reinforced flexible hose which includes the successive steps of placing a rubber tube on a mandrel, moving said mandrel and tube longitudinally in axial relation to a first group of circumferentially spaced wires, wrapping each of said wires about said tube simultaneously to form a first even layer of wires in a helical pattern, moving said mandrel and tube in axial relation to a second group of circumferentially spaced wires, wrapping each of said wires of said second group simultaneously about said first even layer of wires at a winding point thereon within one pitch of a wire of said first even layer from the winding point of said first group of wires.

6. The method of forming a wire reinforced flexible hose which includes the successive steps set forth in claim 5 and wherein the wires of said first and second groups are tensioned uniformly during the wrapping thereof.

7. The method of forming a wire reinforced flexible hose which includes the successive steps set forth in claim 5 and wherein each of the wires of said first group in said first even layer are arranged with their convolutions in side by side relation and wherein each of the wires of said second group in said second even layer are arranged with each of their convolutions in side by side relation.

References Cited in the file of this patent

UNITED STATES PATENTS

| | | |
|---|---|---|
| 83,132 | Coles et al. | Oct. 20, 1868 |
| 2,057,789 | Petersen | Oct. 20, 1936 |
| 2,213,290 | Rowe | Sept. 3, 1940 |
| 2,747,616 | Ganahl | May 29, 1956 |

UNITED STATES PATENT OFFICE
CERTIFICATE OF CORRECTION

Patent No. 3,020,701                      February 13, 1962

Clarence E. McCormick

It is hereby certified that error appears in the above numbered patent requiring correction and that the said Letters Patent should read as corrected below.

In the grant, lines 3 and 4, and in the heading to the printed specification, lines 6 and 7, for "a corporation of Ohio" read -- a corporation of New York --.

Signed and sealed this 12th day of June 1962.

(SEAL)
Attest:

ERNEST W. SWIDER                      DAVID L. LADD
Attesting Officer                       Commissioner of Patents